July 12, 1927.

S. S. GRAVES 1,635,476

PRESSURE COOKER

Filed June 2, 1923

Inventor
SCOTT S. GRAVES.
By A. B. Bowman
Attorney

Patented July 12, 1927.

1,635,476

UNITED STATES PATENT OFFICE.

SCOTT S. GRAVES, OF SAN DIEGO, CALIFORNIA.

PRESSURE COOKER.

Application filed June 2, 1923. Serial No. 643,133.

My invention relates to steam pressure cookers for kitchen or similar use, and the objects of my invention are: first, to provide a cooker of this class in which the cover can be easily and quickly removed from or secured to the vessel; second, to provide a cooker of this class in which the cover is resiliently held in engagement with the top of the vessel; third, to provide a cooker of this class on which no safety or blow-out valve or no pet-cock is required, but in which the excess pressure is relieved or steam is released by the cover being slightly raised from the vessel as the pressure of the steam is increased beyond a certain predetermined high mark or by manually operated means; thus permitting steam to escape; fourth, to provide novel resilient means for securing the cover to the vessel; fifth, to provide as a whole a novelly constructed steam pressure cooker, and sixth, to provide a cooker of this class which is very simple and economical of construction, durable, reliable, and which will not readily deteriorate or get out of order.

Figures 1, 2:
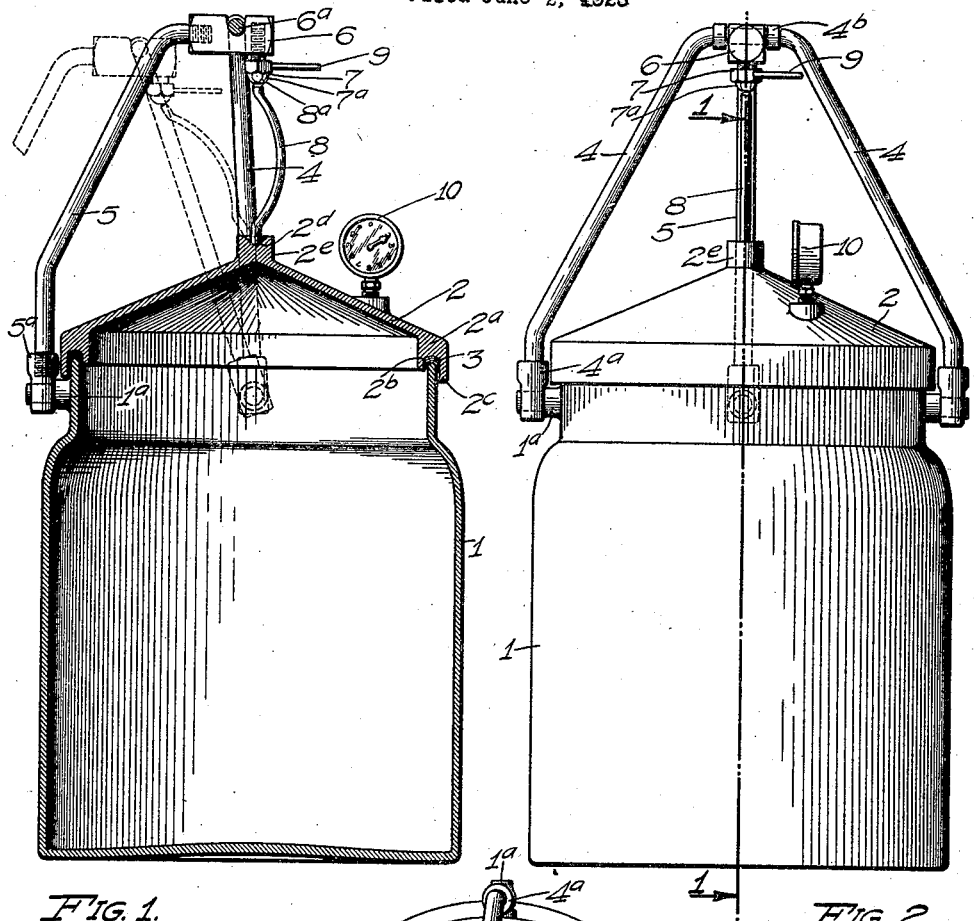
Figure 3:
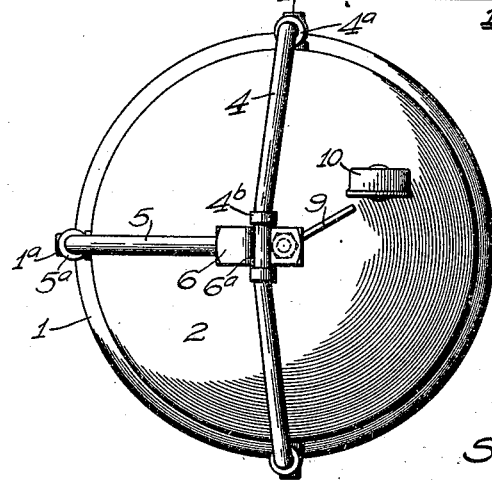

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional elevational view of my steam cooker, taken through 1—1 of Fig. 2, showing by dotted lines certain shifted positions of the cover securing members for securing the cover in position or releasing the same; Fig. 2 is an elevational view thereof, taken at a right angle to that of Fig. 1; and Fig. 3 is a plan view of my cooker.

Like characters of reference refer to similar parts and portions throughout the several views of the drawings.

The vessel 1, cover 2, gasket 3, vessel handle member 4, handle positioning member 5, head member 6, compression adjusting screw 7, spring member 8, handle 9 and the pressure gage 10, constitute the principal parts and portions of my pressure cooker structure.

The cooker vessel 1 and the cover 2 are of substantially heavy construction, preferably cast, to withstand a working pressure of from one to ten pounds of steam. The vessel 1 is made sufficiently large to receive secondary containers in which food is adapted to be placed for cooking or for steaming. The cover 2 is provided with an annular downwardly extending flange $2^a$, which is provided with an annular channel $2^b$ on its under side. It will be noted that the outer portion $2^c$ of the flange $2^a$ extends downwardly a considerable distance from the bottom of the channel or the top rim of the vessel, which is adapted to be positioned therein, and serves to prevent the lid from shifting when lifted by excessive pressure and also as a guide to turn escaping steam downwardly along the side of the vessel. In the annular channel $2^b$ of said cover is provided a gasket 3 made of fabric and a suitable plastic composition applied in the fabric. The vessel is provided at its outer side and near its upper end with outwardly extending lugs $1^a$ with reduced outer ends, the inner ends being secured to the vessel, forming shoulders for the extended ends. On two of said lugs $1^a$, diametrically opposite each other, is pivotally mounted the handle member 4, made of relatively heavy rod, with enlarged portions $4^a$ at its pivoted ends, bent in substantially a U-shape with the sides of the U extending diagonally towards the middle portion, which is provided with spaced apart shoulders or flanges $4^b$, between which is adapted to be positioned the head member 6. Another handle or handle positioning member 5, also made of relatively heavy rod, with an enlarged lower end $5^a$, when in position on the cooker, is similarly placed with its enlarged lower end $5^a$ removably positioned on a third lug $1^a$ on the vessel intermediate said other lugs. On the upper end of said handle positioning member is secured the head member 6. Said head member is provided intermediate its ends and on its upper side with a transverse slot $6^a$, in which is adapted to be positioned the portion of the handle member 4 between the annular flanges. On the end of the head member 6, opposite the member 5, is adjustably positioned the screw 7, which extends downwardly therefrom and is provided at its lower end with a ball socket $7^a$ in which is positioned a ball portion $8^a$ at the upper end of the compression spring member 8. Said spring member is offset laterally intermediate its ends in the shape of a bow and forms an efficient spring of slight longitudinal displacement when compressive force is applied at its ends. The other or lower end of said compression member is adapted to be positioned in a recess 2ᵈ provided in the upper end of the centrally positioned lug 2ᵉ in the cover 2, all substantially as shown in the drawings. The adjusting screw 7 is provided with an outwardly extending lever or handle 9 for adjusting the compression of the member 8 to regulate the pressure of the steam in the cooker. The handle 9 is of such a size that a great force cannot be exerted on the compression member. The pressure gage 10 may be secured in the cover 2 to communicate with the interior of the cooker to indicate the steam pressure therein. It will be noted that upward pressure on the screw 7 causes pressure downwardly and inwardly on the member 5 and holds the portion 5ᵃ on the lugs 1ᵃ without other fastening means and with increasing security as the pressure in the vessel increases.

It will also be noted that as steam is generated in the cooker greater than the compression of the spring member against the cover, the cover will be raised periodically to relieve the excess steam generated in the cooker and thus prevent danger from explosion.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

It is obvious from this construction that there is provided a steam pressure cooker in which the cover can be easily and quickly removed from or secured to the vessel; that there is provided a cooker of this class in which the cover is resiliently clamped to the vessel or container; that there is provided a cooker of this class in which the usual safety or blow-off valve, provided on cookers of this class, is eliminated, and that also the usual pet-cock is eliminated, its function being included in the lid releasing lever 9 and its attachments; that there is provided a cooker in which the excessive pressure of the steam is relieved or the steam is released by reason of the cover being raised from the vessel as the pressure of the steam is increased beyond a certain predetermined high mark; that there is provided novel resilient means for securing the cover to the vessel, and as a whole, a novelly constructed cooker, and that there is provided a cooker of this class which is very simple and economical of construction, durable, reliable, and which will not readily deteriorate or get out of order.

Having thus described my invention what I claim as new and desire to secure by Letters Patent, is:

1. A pressure cooker, including a container, a cover for said container, a handle member pivotally connected to said container and extending upwardly therefrom, a resilient compression member removably positioned between the middle upper portion of the handle member and said cover, and compression adjusting means provided at one end of said resilient compression member.

2. A pressure cooker, including a container, a cover for said container, a handle member secured to said container and extending upwardly therefrom, and a bow-shaped resilient compression member positioned with its lower end in a recess in said cover and its upper end adjacent the middle portion of said handle member.

3. A pressure cooker, including a container, a cover for said container, a handle member secured to said container and extending upwardly therefrom, a bow-shaped resilient compression member positioned with its lower end in a recess in said cover and its upper end adjacent the middle portion of said handle member, and compression adjusting means provided at one end of said compression member.

4. A pressure cooker, including a container, a cover for said container, a handle member secured to said container and extending upwardly therefrom, a resilient compression member pivotally mounted at its upper end contiguous to the middle portion of said handle member and positioned in a recess in said cover at its lower end, and a compression adjusting screw means provided in connection with said resilient compression member.

5. A cooker, including a vessel, a cover for said vessel, a handle member pivotally mounted at the upper end of said vessel and adapted to extend over said cover, a handle positioning member detachably secured to said vessel intermediate the pivotal mountings of said handle member thereon, said handle positioning member being provided at its upper end with a transverse handle positioning slot in which the upper portion of said handle member is adapted to be positioned, and a resilient compression member positioned between the upper end of said handle positioning member and said cover.

6. A cooker, including a vessel, a cover for said vessel, a handle member pivotally mounted at the upper end of said vessel and adapted to extend over said cover, a handle positioning member detachably secured to said vessel intermediate the pivotal mountings of said handle member thereon, said handle positioning member being provided at its upper end with a transverse handle positioning slot in which the upper portion of said handle member is adapted to be positioned, a resilient compression member positioned between the upper end of said handle positioning member and said cover, and a compression adjusting means in connection with said resilient compression member.

7. A cooker, including a vessel, a cover for said vessel, a handle member pivotally mounted at the upper end of said vessel and adapted to extend over said cover, a handle positioning member detachably secured to said vessel intermediate the pivotal mountings of said handle member thereon, said handle positioning member being provided at its upper end with a transverse handle positioning slot in which the upper portion of said handle member is adapted to be positioned, and a bow-shaped compression member positioned intermediate and with its ends engaging said cover and the upper extended end of said handle positioning member.

8. A cooker, including a vessel, a cover for said vessel, a handle member pivotally mounted at the upper end of said vessel and adapted to extend over said cover, a handle positioning member detachably secured to said vessel intermediate the pivotal mountings of said handle member thereon, said handle positioning member being provided at its upper end with a transverse handle positioning slot in which the upper end of said handle member is adapted to be positioned, a bow-shaped compression member positioned intermediate and with its ends engaging said cover and the upper extended end of said handle positioning member, and a compression adjusting screw means provided at one end of said bow-shaped compression member.

9. A cooker, including a vessel, a cover for said vessel, a handle member pivotally mounted at the upper end of said vessel and adapted to extend over said cover, a handle positioning member detachably secured to said vessel intermediate the pivotal mountings of said handle member thereon, said handle positioning member being provided at its upper end with a transverse handle positioning slot in which the upper portion of said handle member is adapted to be positioned, a screw member provided at the extended end of said handle positioning member, and a resilient compression member pivotally mounted at the lower end of said screw member, and the other end of said compression member being adapted to be positioned by a lug secured to said cover.

10. A cooker, including a vessel, a cover for said vessel, a handle member pivotally mounted at the upper end of said vessel and adapted to extend over said cover, a handle positioning member detachably secured to said vessel intermediate the pivotal mountings of said handle member thereon, said handle positioning member being provided at its upper end with a transverse handle positioning slot in which the upper portion of said handle member is adapted to be positioned, a screw member provided at the extended end of said handle positioning member, and a bow-shaped resilient compression member pivotally connected at its upper end with the lower end of said screw member with a ball and socket joint, and its lower end being adapted to be positioned by a recess in the upper middle portion of said cover.

11. In a pressure cooker, a container, a cover for said container, a sealing means in said cover and engaging said container, a handle member pivotally connected to said container and extending upwardly therefrom, and a resilient compression member in connection with said handle member and said cover.

In testimony whereof, I have hereunto set my hand at San Diego, California, this 25th day of May 1923.

SCOTT S. GRAVES.